United States Patent [19]

Diener et al.

[11] 3,865,626
[45] Feb. 11, 1975

[54] POLYESTER FILM OF HIGH STRENGTH AND LOW ELECTRICAL SURFACE RESISTANCE

[75] Inventors: Horst Diener, Frankfort-Hoechst; Helga Lenhart, Wiesbaden; Walter Seifried, Wiesbaden-Biebrich, all of Germany

[73] Assignee: Hoechst Aktiengesellschaft, Frankfurt-am-Main, Germany

[22] Filed: Sept. 18, 1973

[21] Appl. No.: 398,423

Related U.S. Application Data

[63] Continuation of Ser. No. 102,511, Dec. 29, 1970, abandoned, which is a continuation of Ser. No. 757,108, Sept. 3, 1968, abandoned.

[52] U.S. Cl.................... 117/226, 117/7, 117/47 A, 117/138.8 F, 117/213
[51] Int. Cl............................ C09c 1/44, D02g 3/00
[58] Field of Search............ 117/213, 226, 138.8 F, 117/227, 47 A, 7

[56] References Cited
UNITED STATES PATENTS

| | | | |
|---|---|---|---|
| 2,788,296 | 4/1957 | Louis | 117/226 |
| 2,817,603 | 12/1957 | Louis | 117/226 |
| 2,817,604 | 12/1957 | Louis | 117/226 |
| 3,022,192 | 2/1962 | Brandt | 117/47 |
| 3,058,845 | 10/1962 | Hendricks | 117/227 |
| 3,118,785 | 1/1964 | Anderson et al. | 117/227 |
| 3,357,874 | 12/1967 | Kennedy | 117/47 |
| 3,823,035 | 7/1974 | Sanders | 117/226 |

*Primary Examiner*—Mayer Weinblatt
*Assistant Examiner*—Michael F. Esposito
*Attorney, Agent, or Firm*—James E. Bryan

[57] ABSTRACT

This invention relates to a polyester film of high strength and low surface resistance, and to a process for making such a film, the film carrying on at least one surface thereof a binder-free, firmly adhering layer of electroconductive particles.

4 Claims, No Drawings

POLYESTER FILM OF HIGH STRENGTH AND LOW ELECTRICAL SURFACE RESISTANCE

This is a continuation, of application Ser. No. 102,511, filed Dec. 29, 1970 now abandoned which, in turn, is a continuation of Ser. No. 757,108, filed Sept. 3, 1968, and now abandoned.

It is common practice to provide high-polymer natural and synthetic substances, such as caoutchouc and thermoplastic and thermo-setting substances, with additives which serve the purpose of imparting specific physical properties to semifinished or finished articles made of these high-polymer substances.

A particular group of additives consists of inorganic or organic solids of small particle size and adequate dispersibility in the high-polymer substances, both at processing temperature and at room temperature.

By using such pigments or fillers, it is often possible to favorably influence the optical, mechanical and electrical properties of natural and synthetic high-polymer substances, in accordance with the intended use of the finished article.

In order to achieve the best results when using such films, it is often necessary for the pigment or filler particles to be distributed as evenly as possible over the cross-section of the film and to be present in a satisfactory concentration per unit of volume of the film. To achieve this aim, the filler or pigment is incorporated in the raw material either during its production or before it is processed. This method has the disadvantage that it is often inevitable that the pigments or fillers exert an unfavorable effect upon the manufacturing process for the raw material or impede the processing of the high-polymer substance by an anomalous flow behavior.

Thus, incorporation, during the production of the film, of a quantity of filler or pigment required for achieving a certain property, may reduce the mechanical properties of the film to such a degree that films of this kind no longer can be prepared in the form of self-supporting films of extreme thinness, which otherwise is entirely possible when using raw materials containing no such fillers.

Moreover, filled films mean an unnecessary expenditure of pigment, and possibly also an undesirable reduction of the mechanical properties of the film, when only the pigment-covered surface is to become effective physically. With regard to the requirements of color, luster, smoothness, and electrical properties, of a film, it would be sufficient in many cases if only the surfaces, or even only one surface, of the film was covered with pigment. In order to overcome this difficulty, the pigment is attached in such cases to one or both film surfaces by means of a binder. Thus, it is known, e.g., to disperse carbon black in a solution of high-polymer substances in suitable solvents and to apply it to a supporting film of thermoplastic material in the form of a lacquer film pigmented with carbon black.

The binders used must be compatible with the high-polymer substance forming the film surface and with the pigment. The binder necessarily remains on the film surface, where it may interfere particularly with the electrical properties of the film, or may exert an uncontrollable adverse effect upon the adhesion of further coatings. Often, the binders are themselves solutions or dispersions of high-polymer substances, and, when filled with pigment, possess a viscosity which renders it difficult to apply thin, uniform layers to the film. Moreover, electrically conductive pigments, such as carbon black, can not display optimum effects in such lacquer layers, because they are largely surrounded by the high-polymer binder material and only part of the particles increase the conductivity of the surface. Thus, the above mentioned polyester film provided with a polymer layer pigmented with carbon black has a surface resistance of the order of $5 \times 10^5 \Omega$.

The present invention provides polyester films of high mechanical strength combined with a low electrical surface resistance, which avoid the drawbacks of known films of this kind and are highly superior to known thermoplastic films of low electrical surface resistance.

More particularly, the present invention relates to a polyester film of high strength and low surface resistance covered on at least one surface with a thin layer of electroconductive particles and having no additional media present on the film surface responsible for the adhesion of the electroconductive particles to the film surface, it being possible by controlling the density of coverage of the film surface with electroconductive pigment, to adjust the electrical resistance of the film (measured according to the VDE method 0303, part 3) down to values of the order of $10^1 \Omega$.

Although mixed polyester films of high strength may be used according to the present invention, polyethylene terephthalate films of high mechanical strength are particularly preferred.

The surface resistance adjusted in each case is maintained even when the film surface provided with the electroconductive particles is exposed to abrasive wear.

The high strength polyester film of low surface resistance according to the present invention is produced by treating one or both surfaces of a stretched polyester film of high mechanical strength with a solvent or swelling agent capable of swelling or superficially dissolving the polyester film surface, applying electroconductive particles, preferably carbon black, to the surface in a concentration corresponding to the desired surface resistance, and then subjecting the film to a heat treatment. In the case of pigments which are inert to the solvents or swelling agents employed, such as carbon black, the procedure is advantageously such that the electroconductive particles are dispersed in the solvents or swelling agents used for superficially dissolving or swelling the surface of the polyester film, the concentration of the dispersion, relative to the proportion of pigment, ranging from 0.1 to 12.0% by weight, preferably from 0.5 to 5.0%. The quantity of carbon black to be employed per square meter of film surface ranges from 0.1 g/m² to 5.0 g/m², preferably from 0.3 g/m² to 3.0 g/m². The dispersion is applied to the film surface and the film is then subjected to a heat treatment.

If films are to be produced the surface resistance of which should be of the order of $10^5\Omega$, for example, and which are distinguished from known films by the advantage of having binder-free surfaces, 0.4 to 0.6 g of carbon black are applied per square meter.

For particularly advantageous films with a surface resistance below $10^5\Omega$, dispersions with a concentration from 2.5 to 5.0% by weight are used, about 0.6 to 3.0 g of pigment being applied per square meter of film.

In special cases, viz. when the electroconductive pigment is not resistant to the volatile swelling agent or solvent employed, such as in the case of metal particles used in combination with suitable acids or their aqueous solutions as swelling agents, the volatile solvent or swelling agent is applied to at least one surface of the film, the film is then subjected to a heat treatment until the treated surface is substantially free from the previously applied solvent or swelling agent, and finally the electroconductive particles are applied.

Examples of suitable polyester films of high strength are films which have been stretched in one direction at rate 1 : 1.5 to 1 : 6, preferably from 1 : 2 to 1 : 4.5. Suitable biaxially stretched films are those stretched from 2 times to 25 times their original area, preferably from 6 to 18 times. The films also may be heat-set.

Suitable solvents are those known for polyesters, which cause an effective swelling or superficial dissolution of the film surface within a sufficiently short time. They may be subdivided into three groups: phenols or their derivatives, such as monochlorphenol or tetrachlorphenol, cresols, monochlorthymol, dihydroxybenzenes and trihydroxybenzenes, such as resorcinol or pyrogallol; halogenated hydrocarbons, such as methylene-chloride, chloroform, tri-, tetra- and pentachlorethane or trichlorotoluene; and halogenated lower fatty acids, such as bromoacetic acid, dibromopropionic acid, dichloroacetic acid, trichloroacetic acid, trichlorophenoxy acetic acid, trifluoroacetic acid, and trifluoropropionic acid. Of these, the halogenated lower fatty acids are particularly suitable. They are employed in the form of aqueous solutions in a concentration of 5 to 30% by weight. Preferably, the concentration should be from 10 to 20%. In special cases, it may be of advantage to use mixtures of suitable halogenated carboxylic acids or of aqueous solutions of such acids.

Suitable pigments are all those having a sufficiently high degree of electroconductivity, such as metal particles and carbon black, the latter being a particularly suitable material.

The carbon black may be dispersed in the solvent or swelling agent by means of a dispersing apparatus, such as high-speed stirrers, ball mills or ultrasonic mixers. In some cases, it may be advantageous to improve the degree of dispersion of the carbon black in the solvent or swelling agent achieved by means of the dispersing apparatus by adding a suitable dispersing agent. Dispersing agents suitable for this purpose are, e.g.: anionic tensides, such as salts of alkylaryl sulfonic acids, or non-ionic tensides, such as polyhydroxy ethyllaurylether. These substances are added for this purpose in a concentration up to 5% by weight, preferably up to 3%, of the quantity of carbon black present. These substances are not capable of forming layers which become firmly anchored to the surface of the polyester film. Therefore, they can not act as binders for attaching carbon black particles to the film surface. Mixtures of different electroconductive pigments, or mixtures of conductive and non-conductive pigments also may be used.

The heat treatment of the film should last at least 1 second, for practical reasons preferably from 1 to 60 seconds, at temperatures above the glass transition point of the high-polymer film material. Normally, temperatures from 120° to 160°C. are employed, and it is particularly advantageous to operate at temperatures between 130° and 135°C. A heat influence of more than 60 seconds is not detrimental, provided it takes place within the preferred temperature range. However, in the interest of a more economic operation, it is desirable to maintain the heating time as short as possible.

Table I below shows the behavior of a carbon black-coated polyester film of known type and of a film according to the invention as regards their surface resistance, when the films are subjected for a relatively long time to abrasive stress in accordance with the test method mentioned above. In spite of a 100 hour abrasive stress, the film according to the invention exhibits only an insignificant change in its surface resistance, while the surface resistance of a known film increases by three powers of ten under an identical stress.

Table I

| Abrasion | Surface Resistance $\Omega$ | |
| --- | --- | --- |
| | Carbon black Coated Polyester Film of Known Type | Film according to the Invention |
| none | $8.5 \times 10^5$ | 67 |
| 5 hours | $1.2 \times 10^7$ | 87 |
| 100 hours | $1.7 \times 10^8$ | 98 |

The advance in the art constituted by the film of the present invention over known films is particularly striking when comparing the absolute values of the surface resistance of the two films.

The films according to the present invention are suitable for all applications where a low surface resistance is required. They constitute a considerable advance in the art of electrical engineering, since no polyester films having such low surface resistance have been hitherto known. The films according to the invention are used in particular for dielectric layers suitable for high voltages.

The invention will be further illustrated by reference to the following specific examples:

EXAMPLE 1

4.5 g. of carbon black are dispersed in a solution of 15.0 g. of trichloroacetic acid and 80.5 g. of water, and this dispersion is then coated, at a rate of 66.6 g. per square meter, onto one surface of a polyethylene terephthalate film stretched to 16 times its original area. The film is then treated for 10 seconds at 200°C. under conditions which prevent a shrinking of the film, so that each square meter of the film contains 3 g. of carbon black, and the film is then dried for 10 minutes at 150°C. The superficially pigmented polyester film thus produced was subjected to the following tests:

An endless web of the material to be tested is conducted between two felt discs and loaded with a weight of 150 g/cm² where it passes the felt discs. The speed of the web is adjusted such that it passes through 50 cycles per minute. As a measurement of the degree of abrasion resistance, the surface resistance of the film is measured with spring tongue electrodes by the method of VDE 0303, part 3/10, 55.

Table

| Duration of Treatment | Abrasive Stress | Surface Resistance of the Film according to the Invention ($\Omega$) | |
| --- | --- | --- | --- |
| — | — | $2.0 \times 10^{13}$ | unpigmented film |
| — | — | $1.4 \times 10^1$ | superficially pigmented film of the invention |
| 5 minutes | 250 × | $1.5 \times 10^1$ | do. |
| 25 minutes | 1250 × | $1.5 \times 10^1$ | do. |
| 65 minutes | 3250 × | $1.6 \times 10^1$ | do. |
| 7 hours | 21000 × | $2.0 \times 10^1$ | do. |

EXAMPLE 2

3 g. of carbon black are dispersed in 297 g. of methylene chloride, and 300 g. of this dispersion are coated per square meter on one surface of a polyester film, so that the film carries 3 g. of carbon black per square meter, and the film is then dried at 150°C. The film used was a polyester film consisting of 0.5 mole of terephthalic acid, 0.5 mole of isophthalic acid, and 1 mole of ethylene glycol, which had been stretched to 10 times its original area and then treated for 10 seconds at 150°C. under conditions which prevented it from shrinking.

The pigmented film has a surface resistance of $3.4 \times 10^1$ $\Omega$ (measured by means of spring tongue electrodes according to the method of VDE 0303, part 3/10, 55).

EXAMPLE 3

4.5 g. of carbon black are dispersed in a solution of 20.0 g. of trichloroacetic acid and 75.5 g. of water, and 13.3 g. of this dispersion are applied per square meter to one surface of a polyethylene terephthalate film which had been stretched to 16 times its original area and then treated for 10 seconds at 200°C. under conditions which prevent shrinking of the film. The film, which carries 0.6 g. of carbon black per square meter, is then dried for 10 minutes at 150°C.

This film has a surface resistance of $2.4 \times 10^3$ $\Omega$ (measured with spring tongue electrodes by the method of VDE 0303, part 3/10,55).

EXAMPLE 4

3 g. of carbon black are dispersed in a solution of 20 g. of trichloroacetic acid and 77 g. of water, and 13.3 g. of this dispersion are coated per square meter on one surface of a polyethylene terephthalate film stretched to 16 times its original area and then treated for 10 seconds at 200°C. under conditions which prevent it from shrinking. The film, which now contains 0.4 g. of carbon black per square meter, is then dried at 150°C.

This film has a surface resistance of $5 \times 10^5$ $\Omega$ (measured by means of spring tongue electrodes according to the method of VDE 0303, part 3/10, 55).

EXAMPLE 5

3 g. of carbon black are dispersed in a solution of 15 g. of bromoacetic acid and 82 g of water, and the resulting dispersion is coated, at a rate of 10 g. per square meter, onto one surface of a polyethylene terephthalate film which had been stretched to 16 times its original area and then held for 10 seconds at 200°C under conditions which prevent shrinking of the film. The film, which thus carries 0.3 g. of carbon black per square meter, is then dried at 150°C.

The resulting film has a surface resistance of $7.8 \times 10^5$ $\Omega$ (measured by means of spring tongue electrodes according to the method of VDE 0303, part 3/10, 55).

EXAMPLE 6

4 g. of carbon black are dispersed in a solution of 20 g. of m-cresol and 76 g. of water, and the resulting dispersion is then coated, at a rate of 15 g. per square meter, onto one surface of a polyethylene terephthalate film which has been stretched to 16 times its original area and then held for 10 seconds at 200°C under conditions which prevent shrinking of the film. The film, which thus carries 0.6 g of carbon black per square meter, is dried at 150°C.

The resulting film has a surface resistance of $4.1 \times 10^3$ $\Omega$ (measured by means of spring tongue electrodes according to the method of VDE 0303, part 3/10, 55).

It will be obvious to those skilled in the art that many modifications may be made within the scope of the present invention without departing from the spirit thereof, and the invention includes all such modifications.

What is claimed is:

1. A stretched polyester film of high strength having on at least one surface thereof a binder-free, firmly adhering layer of carbon black.

2. A film according to claim 1 having a surface resistance less than $10^6 \Omega$.

3. A process for making a polyester film of high strength and low surface resistance which comprises treating at least one surface of a stretched polyester film with a solvent or swelling agent capable of superficially dissolving or swelling the surface and selected from the group consisting of phenols, halogenated hydrocarbons, and halogenated lower fatty acids,
   applying carbon black to the treated surface,
   and subjecting the film to a temperature above the glass transition temperature of the polyester for a period of at least one second.

4. A process according to claim 3 in which the carbon black is dispersed in the solvent or swelling agent.

* * * * *

UNITED STATES PATENT OFFICE
CERTIFICATE OF CORRECTION

Patent No. 3,865,626            Dated February 11, 1975

Inventor(s) Horst Diener, Helga Lenhart and Walter Seifried

It is certified that error appears in the above-identified patent and that said Letters Patent are hereby corrected as shown below:

Item 30 has been omitted from the patent and should read

--- Foreign Application Priority Data
   September 4, 1967     Germany ............... K 63 273 X/39a$^3$ ---.

Column 3, line 10, after "rate" insert --- of ---.

Signed and sealed this 29th day of April 1975.

(SEAL)
Attest:

RUTH C. MASON
Attesting Officer

C. MARSHALL DANN
Commissioner of Patents
and Trademarks